(12) United States Patent
Chen

(10) Patent No.: US 7,556,372 B2
(45) Date of Patent: Jul. 7, 2009

(54) EYEGLASSES STRUCTURE AND AN EYEGLASSES FRAME

(75) Inventor: Jimmy Chen, Taipei (TW)

(73) Assignee: Aswan International Corp., Taipei (TW)

( * ) Notice: Subject to any disclaimer, the term of this patent is extended or adjusted under 35 U.S.C. 154(b) by 233 days.

(21) Appl. No.: 11/701,512

(22) Filed: Feb. 2, 2007

(65) Prior Publication Data

US 2008/0186444 A1    Aug. 7, 2008

(51) Int. Cl.
*G02C 1/04* (2006.01)
(52) U.S. Cl. .................... 351/106; 351/131; 351/138
(58) Field of Classification Search .................. 351/41, 351/44, 103–109, 124, 136–139
See application file for complete search history.

(56) References Cited

U.S. PATENT DOCUMENTS 5,900,922 A * 5/1999 Moore ....................... 351/103
6,367,927 B2 * 4/2002 Yang ......................... 351/103
6,386,703 B1 * 5/2002 Huang ........................ 351/57
7,347,545 B1 * 3/2008 Jannard et al. ............. 351/106

* cited by examiner

*Primary Examiner*—Huy K Mai
(74) *Attorney, Agent, or Firm*—Rosenberg, Klein & Lee

(57) ABSTRACT

An eyeglasses structure includes a lenses and an eyeglasses frame including a frame, two legs and a nose pad set. The frame has a base from which one resilient arm stretches to either side of the base. The two legs are respectively pivotally connected to ends of the resilient arms. The base has a groove on its lower edge. An engagement part extends from a central portion of the base. The lenses have an upper edge and a lower edge, wherein the upper edge is embedded in the groove. The nose pad set engages with the engagement part and is held at a lower edge of the lenses. Thereby, the eyeglasses structure and eyeglasses frame have a simplified configuration, improved durability and are easy to assemble and disassemble and there is little risk of damaging the lenses.

7 Claims, 6 Drawing Sheets

EYEGLASSES STRUCTURE AND AN EYEGLASSES FRAME

BACKGROUND OF THE INVENTION

1. Field of the Invention

The present invention generally relates to an eyeglasses structure and an eyeglasses frame. More particularly, the invention relates to an eyeglasses structure and an eyeglasses frame which can be quickly disassembled and reassembled, preventing the lenses from being damaged during use and increases the user life of the eyeglasses.

2. Description of Related Art

As the quality of life improves for a great deal of the world's population, consumers are demanding a lot more of their eyeglasses, including comfort, fewer components, a more fashionable appearance and easily replaceable components.

Referring to FIGS. 1 and 2, a conventional structure of eyeglasses includes a frame 50, two legs 60, lenses 70, and a pair of nose pads 80. A groove 51 and recesses 52 are respectively formed at a lower edge and an inner side of the frame 50. Two protrusions 71 are formed at both sides of the lenses 70. An upper edge of the lenses 70 engages with the groove 51. The two protrusions 71 engage with the two recesses 52 so that the lenses 70 is fixed on the frame 50. The legs 60 are pivotally connected to ends of the frame 50. The nose pads 80 are embedded at lower edge on a central part of the lenses 70.

Even though such a structure offers advantages such as fewer components and ease of disassembly, an external force needs to stretch the lenses 70 to engage with a groove 51. During disassembly, more external force is required to remove the lenses 70 by releasing a protrusion of the lenses 70 from a recess 52. Therefore, it is easy to break the lenses 70 and thus increases the costs of use. Furthermore, the engagement configuration on both sides may add width to the entire frame. The upper edge of the lenses is 70 completely received inside the groove 51 of the frame 50. When worn, both sides of the frame 50 often become deformed due to the shape or size of the user's head. The lenses 70 therefore become painful to the wearer and its focus location may change possibly causing damage to the wearer's eyes.

SUMMARY OF THE PRESENT INVENTION

It is an object of the present invention to provide an eyeglasses structure and an eyeglasses frame, which can be disassembled and reassembled quickly without changing the curvature of the lenses and offers improved durability for the eyeglasses structure.

In order to achieve the above and other objectives, the eyeglasses structure of the present invention includes a frame having a base, wherein a groove is formed at a lower edge of the base, one resilient arm stretches from the base to either side of the base, and an engagement part extends downward from a central portion of the base; two legs, respectively pivotally connecting to ends of the resilient arms; a lenses, having an upper edge and a lower edge, wherein the upper edge is embedded in the groove; and a nose pad set, engaged with the engagement part and held at a lower edge of the lenses.

The invention also provides an eyeglasses frame that includes a frame having a base, wherein a groove is formed at a lower edge of the base, one resilient arm stretches to either side of the base, and an engagement part extends downward from a central portion of the base; two legs, respectively pivotally connecting to ends of the resilient arms; and a nose pad set, engaged with the engagement part.

The eyeglasses structure and eyeglasses frame of the invention provide advantages over the prior art as follows. The frame has two resilient arms extended from both sides of the frame to absorb extra deformation generated when an external force is exerted upon the frame. However, even though the frame is resiliently deformed, no further curvature generates to the lenses, which would cause damage to the lenses. Furthermore, the lenses of the upper edge and the lower edge are formed with a smooth profile that can be easily embedded in the groove and the flange. Furthermore, no further curvature is generated to the lenses during assembly, and it is easily to remove the lenses with ease thereby lowering the possibility of breaking the lenses. In addition, the configuration of the attaching piece provides improved security for the lenses, preventing the lenses from dropping or sliding from the wearer's face.

To provide a further understanding of the present invention, the following detailed description illustrates embodiments and examples of the present invention, this detailed description being provided only for illustration of the present invention.

DETAILED DESCRIPTION OF THE EMBODIMENTS

Figure 1:
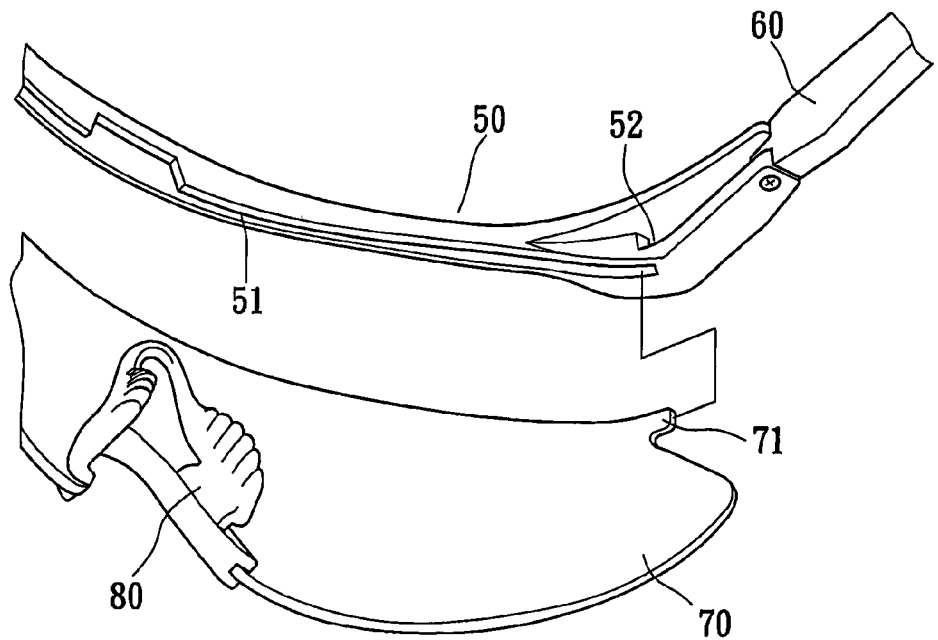
FIG. 1 is a partial perspective exploded view of a conventional eyeglasses structure.
Figure 2:
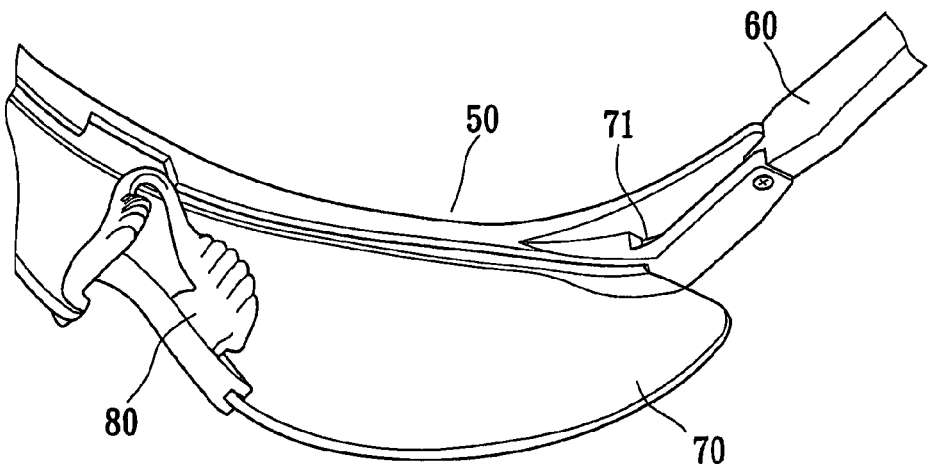
FIG. 2 is a partial perspective view of a conventional eyeglasses structure.

Wherever possible in the following description, like reference numerals will refer to like elements and parts unless otherwise illustrated.

Figure 3:
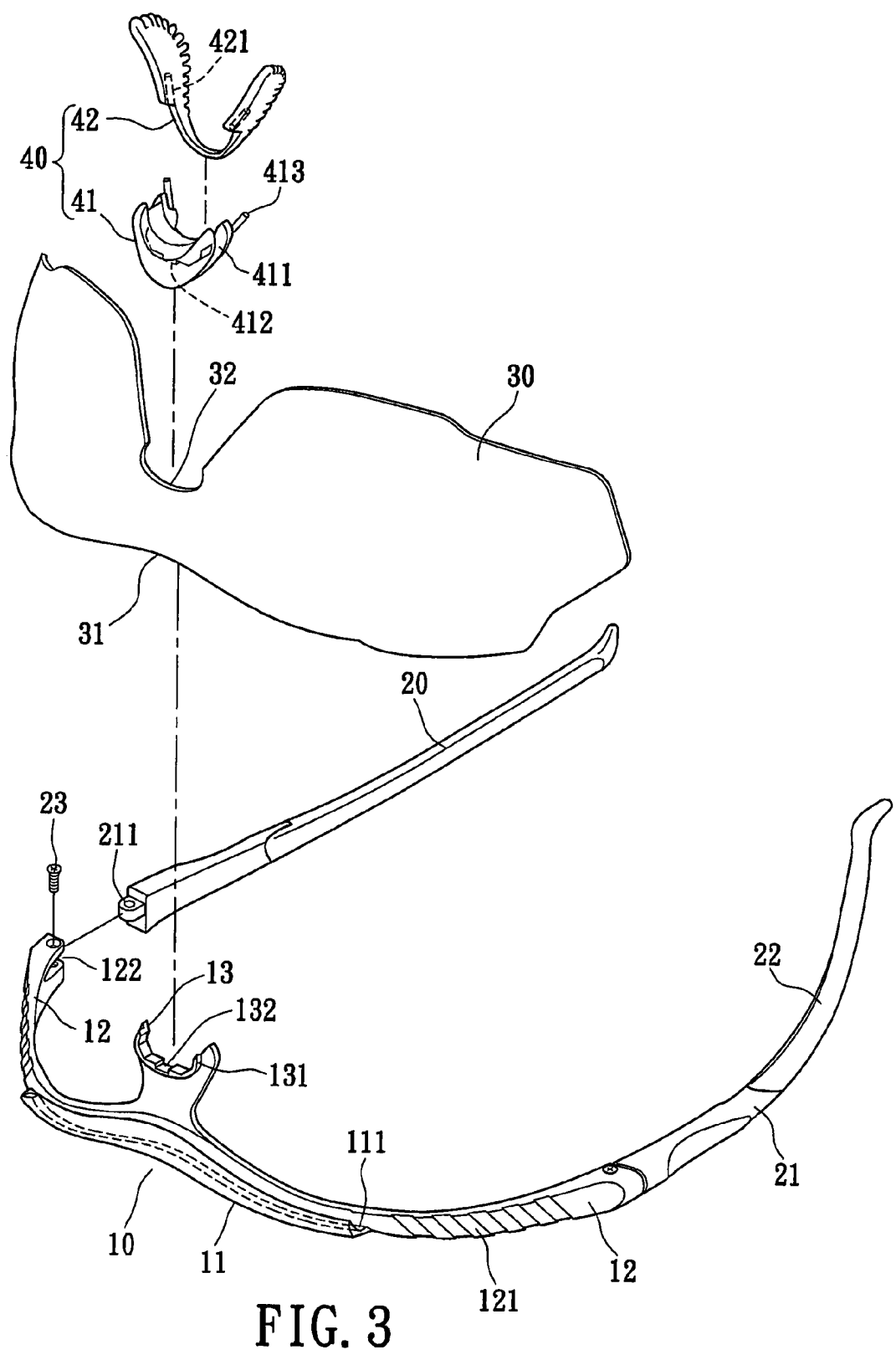
FIG. 3 is a perspective exploded view of an eyeglasses structure according to one embodiment of the invention.
Figure 4:
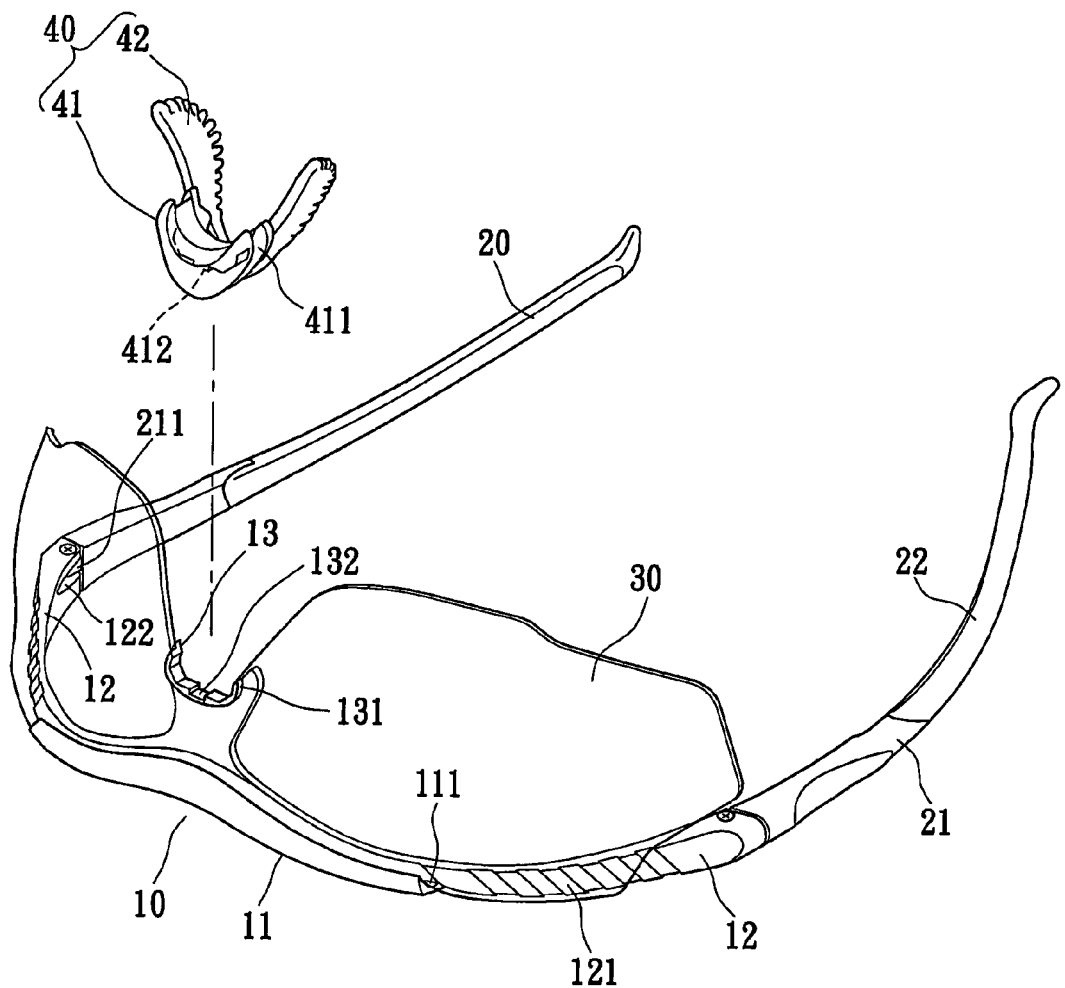
FIG. 4 is a perspective exploded view of a nose pad set and a frame of an eyeglasses structure according to one embodiment of the invention.
Figure 5:
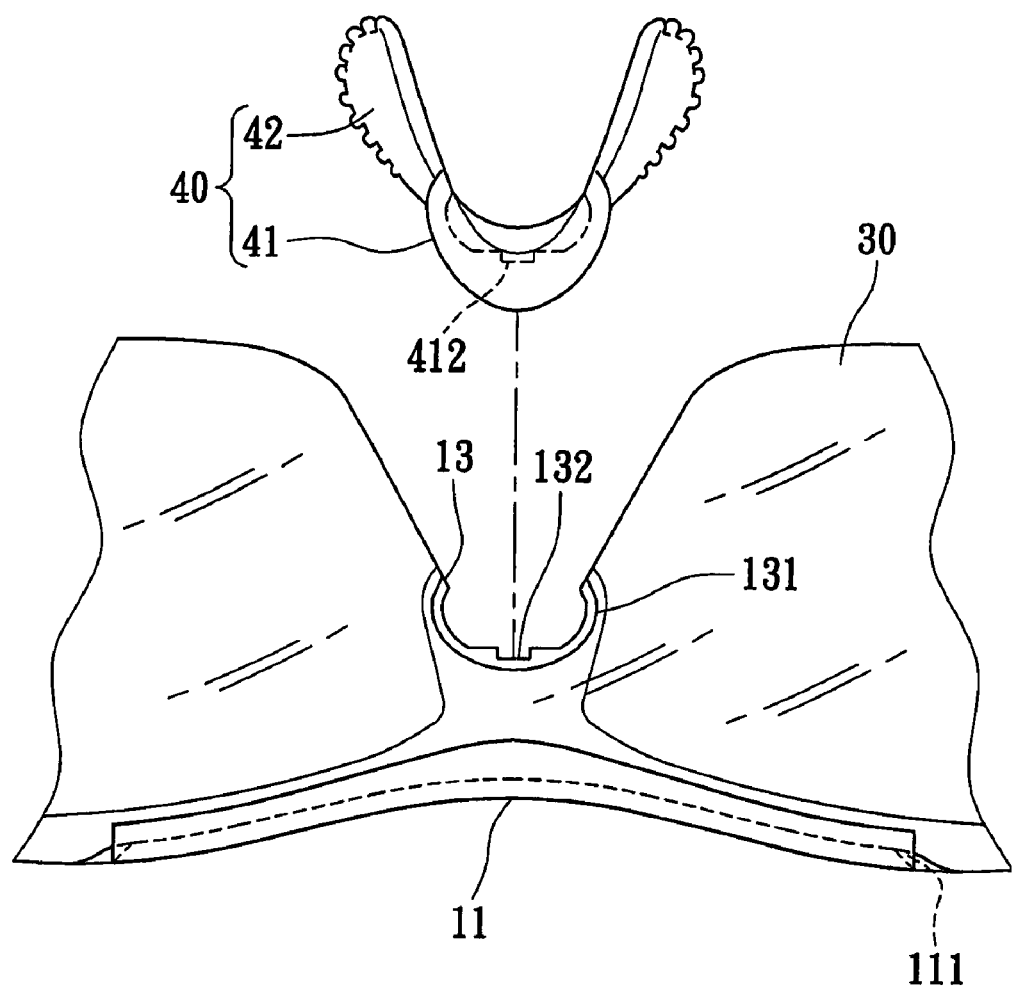
FIG. 5 is a front view of a nose pad set and a frame of an eyeglasses structure according to one embodiment of the invention.
Figure 6:
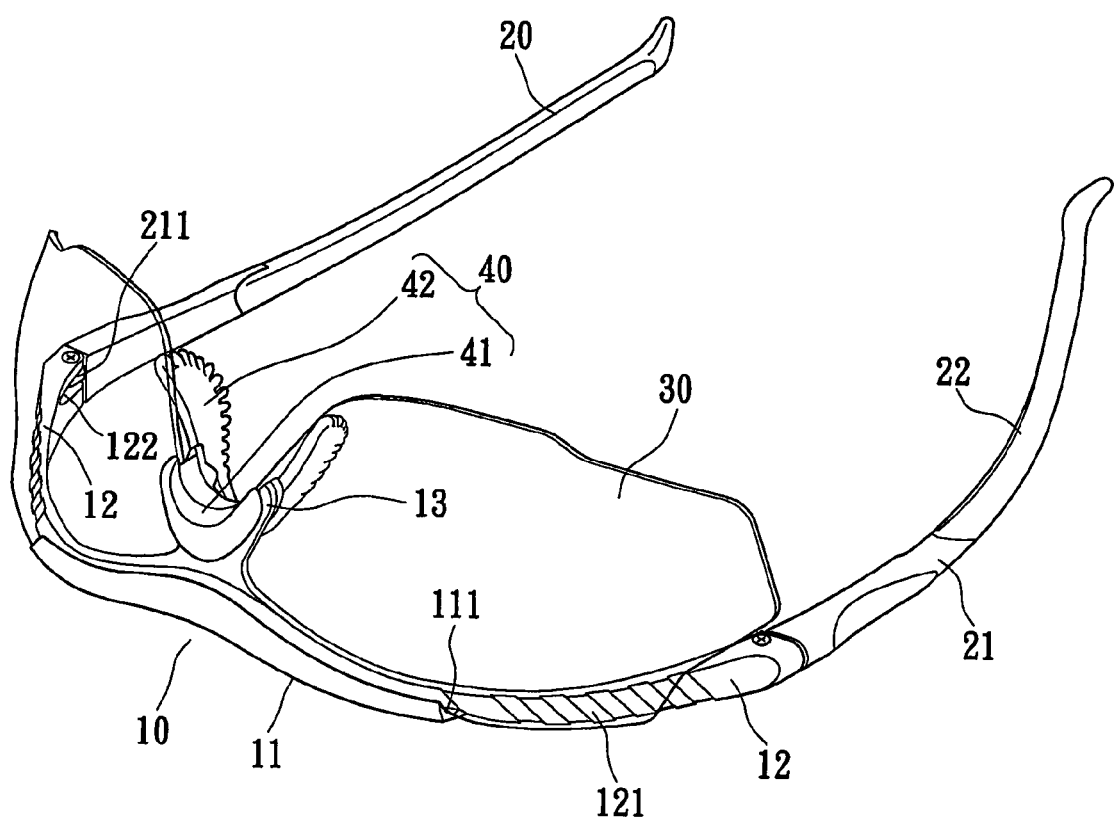
FIG. 6 is a perspective view of an eyeglasses structure according to one embodiment of the invention.

Referring to FIG. 3, this invention provides an eyeglasses structure including a frame 10, two legs 20, lenses 30, and nose pad set 40.

As shown in FIG. 3 to FIG. 6, the frame 10 has a base 11, two resilient arms 12 and an engagement part 13. A groove 111 is at a lower edge of the base 11. The two resilient arms 12 extend a certain distance from either side of the base 11 in a resilient manner. A plurality of slant-slope recesses 121 are formed at external sides of the two resilient arms 12 to add resilient displacement to the resilient arms 12. A receiving part 122 is formed at each end of the arms 12. The engagement part 13 protrudes forward a flange 131. A dent 132 is formed on an inner face of the engagement part 13.

Each of the two legs 20 has a first rod 21 and a second rod 22. The second rod 22 extends from a rear of the first rod 21 and then bends gradually. The two legs 20 are positioned opposite to each other. A pivoting part 211 extends from a front end of the first rod 21 and respectively pivotally connects to ends of the two resilient arms 12.

A first recess 31 and a second recess 32 are respectively formed at an upper edge and a lower edge of the lenses 30 to correspond to the groove 111 and the flange 131.

The nose pad set 40 has at least one attaching piece 41 and at least one pair of nose pads 42. A groove 411 is formed on an inner face of the attaching piece 41. A protrusion 412 stretches into the groove 411. Two inserting parts 413 extend from the attaching piece 41. The nose pad 42 has two fixing holes 421.

Two receiving parts 122 of the frame 10 respectively match with pivoting parts 211 of the legs 20. A screw 23 penetrates through the receiving part 122 and the pivoting part 211 so that the legs 20 respectively pivotally connect to the two resilient arms 12 and are able to rotate.

The first recess 31 of the lenses 30 is embedded into the groove 111. The second recess 32 is against the flange 131 so that lenses can be protected from being damaged or scratched during assembly.

The two inserting parts 413 of the attaching piece 41 respectively insert into the two fixing holes 421 to bind the attaching piece 41 to the nose pad 42. The attaching piece 41 engages with the engagement part 13 in a manner wherein the engagement part 13 lies in the groove 411 and the dent 132 receives the protrusion 412 so that the attaching piece 41 joints with the engagement part 13. The groove 411 holds the inner lower side and the outer lower side of the lenses 30, preventing the lenses 30 from being dropped or sliding from the nose of the wearer.

Figure 7:
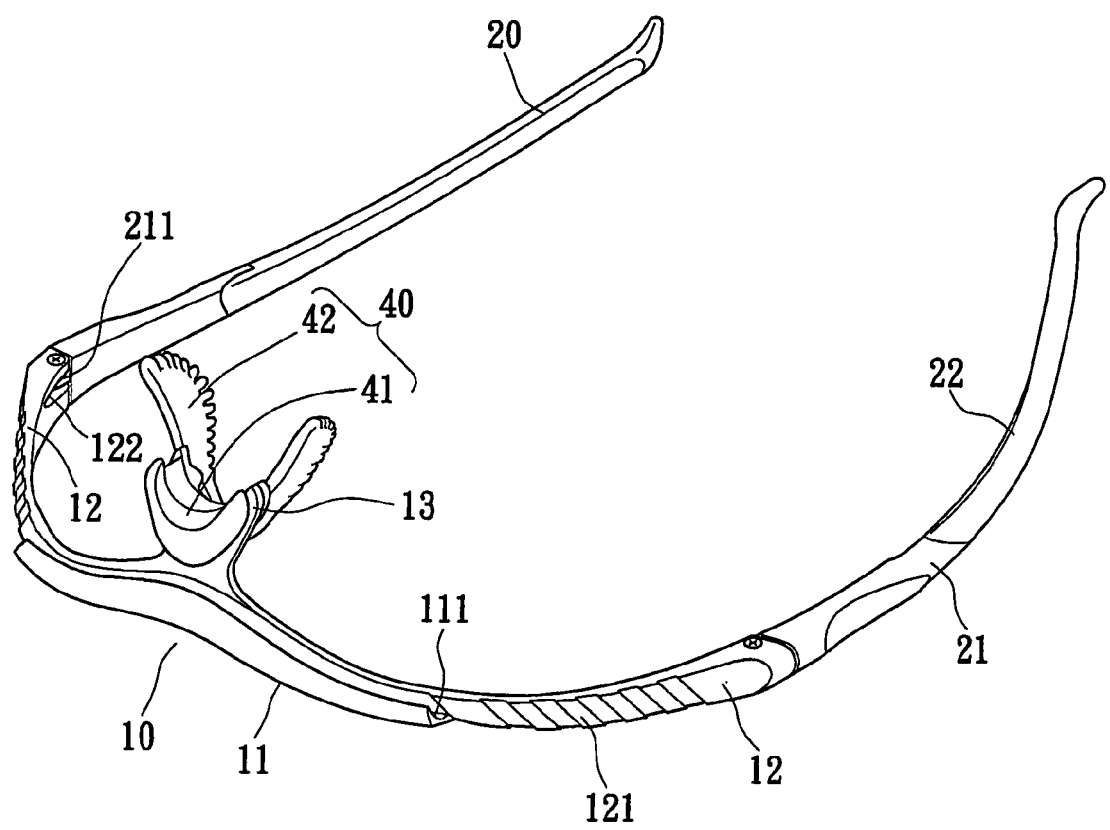
FIG. 7 is a perspective view of an eyeglasses structure according to one embodiment of the invention.

As shown in FIG. 7, with the combination of the frame 10, the two legs 20 and the nose pad set 40, the attaching piece 41 of the nose pad set 40 engages with the engagement part 13 of the frame 10. Thereby, the eyeglasses structure of the invention is accomplished.

The invention provides advantages over the prior art as follows.

The frame 10 has two resilient arms 12 extended from both sides of the frame 10 to absorb extra deformation generated when the frame external forces are exerted upon the eyeglasses. However, even though the frame 10 is resiliently deformed, no further curvature generates to the lenses 30, which would cause damage to the lenses 30.

The lenses 30 of which the upper edge and the lower edge are formed with a smooth profile can be easily embedded in the groove 111 and the flange 131. Furthermore, the no further curvature generates to the lenses 30 during assembly, and it is easy to remove the lenses 30 so that there is little chance of breaking the lenses 30.

The configuration of the attaching piece 41 provides improved security for the lenses 30, preventing the lenses 30 from being dropped or sliding from the wearer's nose.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. An eyeglasses structure, comprising
a frame, having a base, wherein a groove is formed at a lower edge of the base, a pair of resilient arms respectively extends from each side of the base, each of the resilient arms having a plurality of slant-slope recesses formed in external sides thereof for adding resiliency to the resilient arms, the base having an engagement part extending downwardly from a central portion thereof, the engagement part having a forwardly extending flange formed thereon;
two legs, respectively pivotally connecting to ends of the resilient arms;
a lens, having an upper edge and a lower edge, wherein a portion of the upper edge is embedded in the groove and a portion of the lower edge abuts the forwardly extending flange; and
a nose pad set, engaged with the engagement part and held at the portion of the lower edge of the lens, the nose pad set having at least one attaching piece and at least one pair of nose pads attached to the attaching piece, the attaching piece having a groove into which the flange of the engagement part is received to thereby retain inner and outer sides of the portion of the lower edge of the lens abutting the flange.

2. The eyeglasses structure of claim 1, wherein recesses are respectively formed at an upper edge and a lower edge of the lens corresponding to the groove and the flange.

3. The eyeglasses structure of claim 1, wherein two inserting parts extend downwardly from the attaching piece, each of the nose pads having two fixing holes, and the two inserting parts respectively insert into the fixing holes.

4. The eyeglasses structure of claim 1, wherein the attaching piece has a protrusion extending from within the groove, and the engagement part has a dent to receive the protrusion.

5. An eyeglasses frame, comprising:
a frame, having a base, wherein a groove is formed at a lower edge of the base for receiving a portion of an upper edge of a lens therein, a pair of resilient arms respectively extends from each side of the base, each of the resilient arms having a plurality of slant-slope recesses formed in external sides thereof for adding resiliency to the resilient arms, the base having an engagement part extending downwardly from a central portion thereof, the engagement part having a forwardly extending flange formed thereon for abutting against a portion of a lower edge of the lens;
two legs, respectively pivotally connecting to ends of the resilient arms; and
a nose pad set, engaged with the engagement part, the nose pad set having at least one attaching piece and at least one pair of nose pads attached to the attaching piece, the attaching piece having a groove into which the flange of the engagement part is received to thereby retain the portion of the lower edge of the lens abutting the flange.

6. The eyeglasses frame of claim 5, wherein two inserting parts extend downwardly from the attaching piece, the nose pad has two fixing holes for receiving the two inserting parts therein.

7. The eyeglasses of claim 5, wherein the attaching piece has a protrusion extending from within the groove, and the engagement part has a dent for receiving the protrusion.

* * * * *